US011720183B2

(12) United States Patent
Heldeis

(10) Patent No.: US 11,720,183 B2
(45) Date of Patent: Aug. 8, 2023

(54) METHOD FOR OPERATING AN ACTIVE INPUT ELEMENT AND CORRESPONDING INPUT ELEMENT, INPUT ARRANGEMENT AND COMPUTER PROGRAM PRODUCT

(71) Applicant: Christoph Heldeis, Munich (DE)

(72) Inventor: Christoph Heldeis, Munich (DE)

( * ) Notice: Subject to any disclaimer, the term of this patent is extended or adjusted under 35 U.S.C. 154(b) by 107 days.

(21) Appl. No.: 16/484,980

(22) PCT Filed: Feb. 14, 2017

(86) PCT No.: PCT/EP2017/053223
§ 371 (c)(1),
(2) Date: Aug. 9, 2019

(87) PCT Pub. No.: WO2018/149471
PCT Pub. Date: Aug. 23, 2018

(65) Prior Publication Data
US 2019/0369745 A1    Dec. 5, 2019

(51) Int. Cl.
*G06F 3/023* (2006.01)
*G06F 3/00* (2006.01)
(Continued)

(52) U.S. Cl.
CPC ............ *G06F 3/0238* (2013.01); *G06F 3/007* (2013.01); *G06F 3/0219* (2013.01); *H01H 13/83* (2013.01)

(58) Field of Classification Search
CPC ...... G06F 3/0238; G06F 3/007; G06F 3/0219; G06F 3/023; G06F 3/1446; H01H 13/83; H01H 2219/016; G09G 3/32
See application file for complete search history.

(56) References Cited

U.S. PATENT DOCUMENTS 4,539,884 A * 9/1985 Aoki ................. G10H 7/06
84/604
4,788,543 A * 11/1988 Rubin ................ H04B 1/662
340/7.21
(Continued)

FOREIGN PATENT DOCUMENTS

CN    1906657 A    1/2007
EP    2110833       10/2009
(Continued)

OTHER PUBLICATIONS

International Search Report and Written Opinion, PCT/EP2017/053223, dated Nov. 13, 2017, 14 pages.
(Continued)

*Primary Examiner* — Lunyi Lao
*Assistant Examiner* — Jarurat Suteerawongsa
(74) *Attorney, Agent, or Firm* — Leydig, Voit & Mayer, Ltd.

(57) ABSTRACT

The present invention refers to a method for operating an active input element and a corresponding input element, input arrangement and computer program product, comprising the steps: a) set value C of clock counter to 0 (S2); b) increase value C of clock counter by 1 and shift data in shift register (5) by one Bit, when detecting a clock information (S3); c) compare (S4) value C of clock counter with a cycle length CLL, and return to step b) if comparison result is negative or proceed to step d) if comparison result is positive; d) read data ($D_{FIFO}$) from shift register (S5); e) compare (S6) said read data ($D_{FIFO}$) from shift register (5) with predetermined first data value (D1), and proceed to step f) if comparison result is positive or proceed to step a) if comparison result is negative; f) write data ($D_{IE}$) derived from analog input device (S) into shift register (S7) and return to step a).

10 Claims, 3 Drawing Sheets

(51) Int. Cl.
*G06F 3/02* (2006.01)
*H01H 13/83* (2006.01)

(56) References Cited

U.S. PATENT DOCUMENTS

| | | | | |
|---|---|---|---|---|
| 4,825,201 | A * | 4/1989 | Watanabe | G06F 3/147 345/2.1 |
| 5,297,070 | A * | 3/1994 | Hua | G06F 5/015 708/404 |
| 5,421,590 | A | 6/1995 | Robbins | |
| 5,653,637 | A | 8/1997 | Tai | |
| 5,793,356 | A * | 8/1998 | Svancarek | A63F 13/06 345/161 |
| 6,657,574 | B1 * | 12/2003 | Rhode | H03M 1/1205 341/141 |
| 7,157,649 | B2 * | 1/2007 | Hill | G06F 3/0433 178/18.01 |
| 8,866,642 | B2 * | 10/2014 | Ron | H03M 11/24 341/26 |
| 9,876,510 | B2 * | 1/2018 | Heldeis | H03M 11/003 |
| 2003/0048255 | A1 * | 3/2003 | Choi | G06F 3/0317 345/166 |
| 2007/0285393 | A1 * | 12/2007 | Ishakov | G06F 3/0238 345/168 |
| 2007/0296709 | A1 * | 12/2007 | GuangHai | G06F 3/0227 345/173 |
| 2009/0050450 | A1 * | 2/2009 | Cheng | G06F 3/023 200/43.01 |
| 2009/0152077 | A1 * | 6/2009 | Lee | F16H 61/0251 200/43.03 |
| 2009/0167678 | A1 * | 7/2009 | Orr | G06F 1/1694 345/156 |
| 2014/0267075 | A1 * | 9/2014 | Shahparnia | G06F 3/0446 345/173 |

FOREIGN PATENT DOCUMENTS

| | | |
|---|---|---|
| TW | 200503429 A | 1/2005 |
| TW | 201014198 A | 4/2010 |
| TW | I485991 B | 5/2015 |
| WO | WO 2005/057320 | 6/2005 |
| WO | WO 2014/131699 | 9/2014 |

OTHER PUBLICATIONS

English translation of Examination Report and Search Report, Taiwan Patent Application No. 107101573, dated Jan. 23, 2019, 8 pages.

* cited by examiner

METHOD FOR OPERATING AN ACTIVE INPUT ELEMENT AND CORRESPONDING INPUT ELEMENT, INPUT ARRANGEMENT AND COMPUTER PROGRAM PRODUCT

CROSS-REFERENCE TO RELATED APPLICATIONS

This application is a U.S. National Stage Application under 35 U.S.C. § 371 of International Application No. PCT/EP2017/053223, filed Feb. 14, 2017, which is hereby incorporated by reference in its entirety.

FIELD OF THE INVENTION

The present invention relates generally to a method for operating an active input element and a corresponding input element, input arrangement and computer program product, and more particularly to a method for operating an active input element, a corresponding input element, and an input arrangement which reduces the effects of contact bounce.

BACKGROUND OF THE INVENTION

There exist already a plurality of conventional keyboard types, however, there are still some problems remaining. Simply constructed keyboards often have problems with the accurate detection of their key switches. These problems are often known for instance as "ghost keys" and "mask keys" or "contact bounce" also called as "chatter".

The reason for "contact bounce" or "chatter" is that, when the contacts strike together, the momentum and elasticity of the key switch act together to cause them to bounce apart one or more times before making steady contact. This may result in a rapidly pulsed electric current which may be misinterpreted as pressing the key switch multiple times.

Document WO 2014/131699 A1 discloses already a method for determining active input elements of an input arrangement and a corresponding input arrangement with a matrix structure, wherein a plurality of the problems of conventional keyboards or input arrangements are solved already. However, the layout of the circuitry as well as the evaluation of the detected signals is still complex.

It is, therefore, a need in the art to provide a method for operating an active input element and a corresponding input element, input arrangement and computer program product which further reduces the complexity of the layout as well as the signal evaluation.

SUMMARY OF THE INVENTION

This need is accomplished by the independent claims of the present invention. The further subclaims refer to specific embodiments of the present invention.

According to an embodiment of the present invention there is provided a method for operating an active input element of an input arrangement, comprising the steps: a) set a value C of a clock counter to 0; b) increase the value C of the clock counter by 1 and shift data in shift register by one Bit, when detecting a clock information; c) compare the value C of the clock counter with a cycle length CLL, and return to step b) if comparison result is negative or proceed to step d) if comparison result is positive; d) read data from shift register; e) compare said read data from shift register with predetermined first data value, and proceed to step f) if comparison result is positive or proceed to step a) if comparison result is negative; f) write data derived from analog input device into shift register and return to step a).

According to a further embodiment of the present invention there is provided an active input element of an input arrangement, comprising: an analog input device for generating an analog signal; an input converter for converting the analog input signal to a digital input signal; a shift register for storing input and/or output data; and a data processing unit for controlling the shift register and the input converter.

According to a further embodiment of the present invention there is provided an input arrangement comprising a plurality of the above-mentioned input elements, wherein the input elements are connected by a serial interface, and an input arrangement controller for controlling said plurality of input elements.

Moreover, according to the present invention there is provided a computer program product for performing the above-mentioned method steps.

According to the present invention the layout of the circuitry of the input arrangement as well as the evaluation of the detected signals is reduced significantly while the detection accuracy is still high.

The method may comprise the further steps g) of comparing said read data from the shift register with a predetermined second data value, and proceeding to step h) if comparison result is positive or proceeding to step a) if comparison result is negative; h) reading data from shift register for next following v read cycles, wherein v=1 to 5; i) evaluating said read data and controlling the input element according to said read data. Thus, there exists also the possibility to send information to the input element, e.g. key, and to control it.

The method may further comprise an initialization step for setting a number $N_{IE}$ of input elements to a value n of input elements being serially connected within the input arrangement, for setting a word length W to a value of m Bits defining the length of the shift register, and for calculating said cycle length $CLL = W \times N_{IE}$.

For instance in step h) of the above-mentioned method the number of read cycles may be v=3 to receive 3 read data, particularly in the next following cycles, and in step i) an output device, particularly a RGB-LED, of the input element may be controlled according to these read data. Thus, an optical view of each input element or key may be set flexible and selectively.

Moreover, in step h) of the above-mentioned method the number of read cycles may be only v=1 to receive exactly 1 read data in the next following cycle, and in step i) threshold, sensitivity or calibration values of the input element are controlled according to this read data. Thus, e.g. aging or degradation effects of the input element may be compensated or eliminated.

The clock information may be provided by an input arrangement controller via a separate clock line of a serial bus. However, the clock information may be also provided implicitly by a so called 1-wire-interface. Thus, the complexity of the layout may be further reduced. The synchronization between the input arrangement controller and each input element may be realized in an asynchronous or synchronous manner.

The shift register of the input element may be controlled on the basis of a word length W of the shift register, a number $N_{IE}$ of input elements within the input arrangement and a count value C of a clock information. This may further reduce the complexity of the layout since there is no need for a so called select line.

In particular, the data processing unit of the input element may determine a trigger signal for a READ/WRITE operation of the shift register on the basis of a cycle length $CLL=W \times N_{IE}$, wherein W is the word length of the shift register and $N_{IE}$ is the number of input elements within the input arrangement. This may further reduce the complexity of the layout as well as of the signal evaluation.

According to the present invention an output converter may convert a digital output signal to an analog output signal; and an output device may generate an output signal on the basis of the analog output signal. Thus, the input element may not only detect its status (e.g. pushed or not-pushed) but also receive and output information, e.g. in the form of optical, acoustical and/or mechanical signals, to a user.

According to a preferred embodiment of the present invention the input device is an analog switch, sensor and/or potentiometer. Thus, not only digital "on/off" states but also analog "higher/lower" signals may be detected and calibrated. Thus, sophisticated game consoles may be realized also.

According to the present invention the input arrangement may be, in particular, a keyboard, a keypad, a game console, a game pad or a computer mouse.

The foregoing has outlined rather broadly the features and technical advantages of embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTIONS OF THE DRAWINGS

For a more complete understanding of the present invention and the advantages thereof, reference is now made to the following description taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific way to make and use the invention, and do not limit the scope of the invention. Moreover, same reference signs refer to same technical features if not stated otherwise. As far as "may" is used in this application it means the possibility of doing so as well as the actual technical implementation.

The present invention will be described with respect to preferred embodiments in a specific context namely an input arrangement in the form of a keyboard with stroke keys as input elements. The invention may also be applied, however, to other input arrangements.

Figure 1:
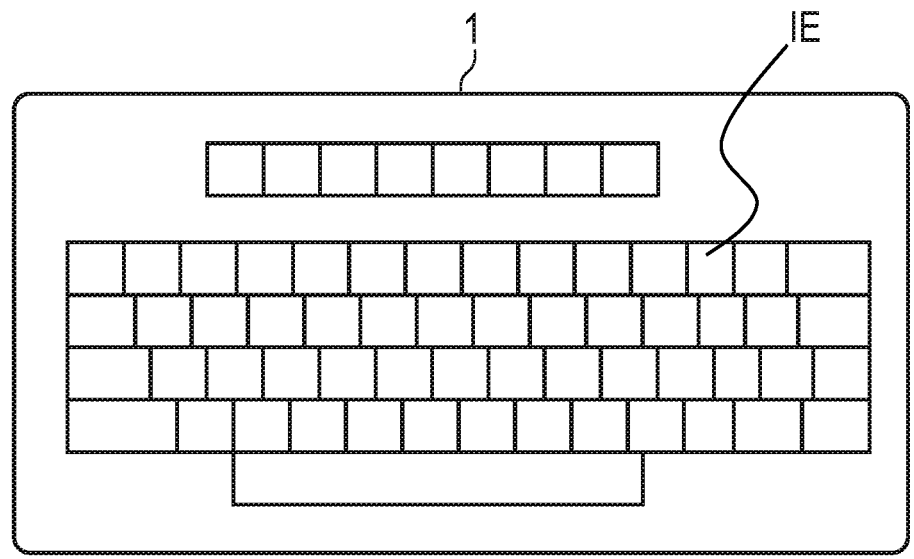
FIG. 1 illustrates a plan view of an input arrangement.

FIG. 1 illustrates a plan view of an input arrangement which may be realized in the form of a keyboard or keypad. It shall be understood that alternative input arrangements, in particular, in the form of e.g. a game console, a game pad or a computer mouse may be also realized according to the present invention.

According to FIG. 1 the input arrangement 1 may comprise a plurality of input elements IE in the form of e.g. touch keys, stroke keys etc. It shall be understood that, particularly in case of game consoles, alternative input elements in the form of e.g. control sticks, rollers, or d-pads may be also realized according to the present invention.

An input arrangement 1 in the form of a keyboard, as shown in FIG. 1 may comprise multiple character keys (e.g. alphabet keys, numeric keys, symbol keys, space keys etc.) and multiple function keys (repeat key, tab key etc.) as input elements IE.

Figure 2:
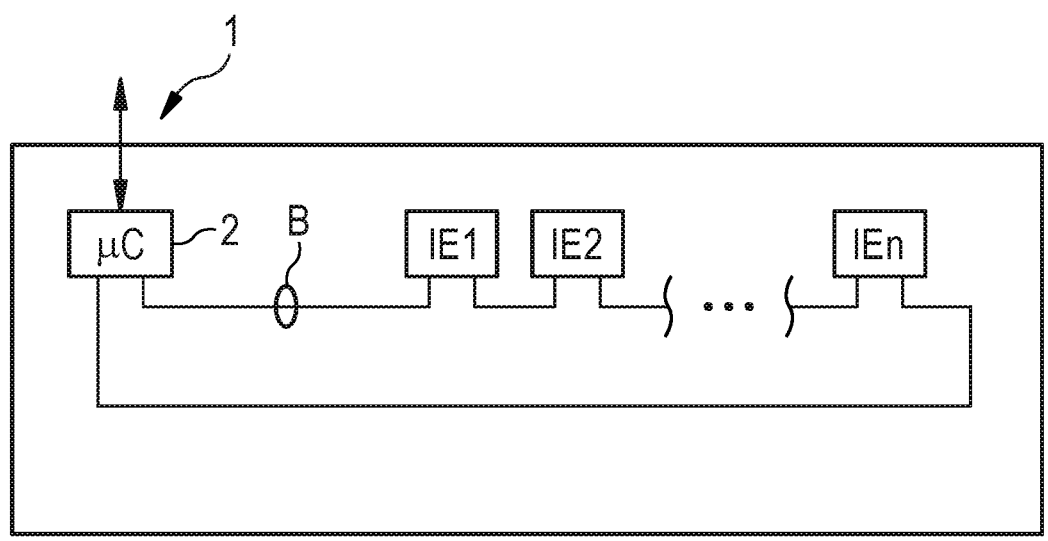
FIG. 2 illustrates a simplified block diagram of the input arrangement in accordance with an embodiment of the present invention.

FIG. 2 illustrates a simplified block diagram of the input arrangement 1 in accordance with an embodiment of the present invention. According to FIG. 2 the input arrangement 1 may comprise an input arrangement controller 2 for connecting the input arrangement 1 e.g. with a personal computer (not shown) and for controlling the plurality of input elements IE1 to IEn. The input arrangement controller 2 may be connected to e.g. the personal computer via a so called USB-interface, PS2-interface or any other interface and transmits the status of the input elements IE1 to IEn in order to control e.g. a program or a display (not shown) of the personal computer.

According to an embodiment of the present invention the input elements IE1 to IEn may be connected with each other via a serial interface B including a clock information, a data receive information, a data transmit information, a select information, a power supply and Ground. The serial interface B may be an asynchronous or synchronous serial interface.

Figure 3:
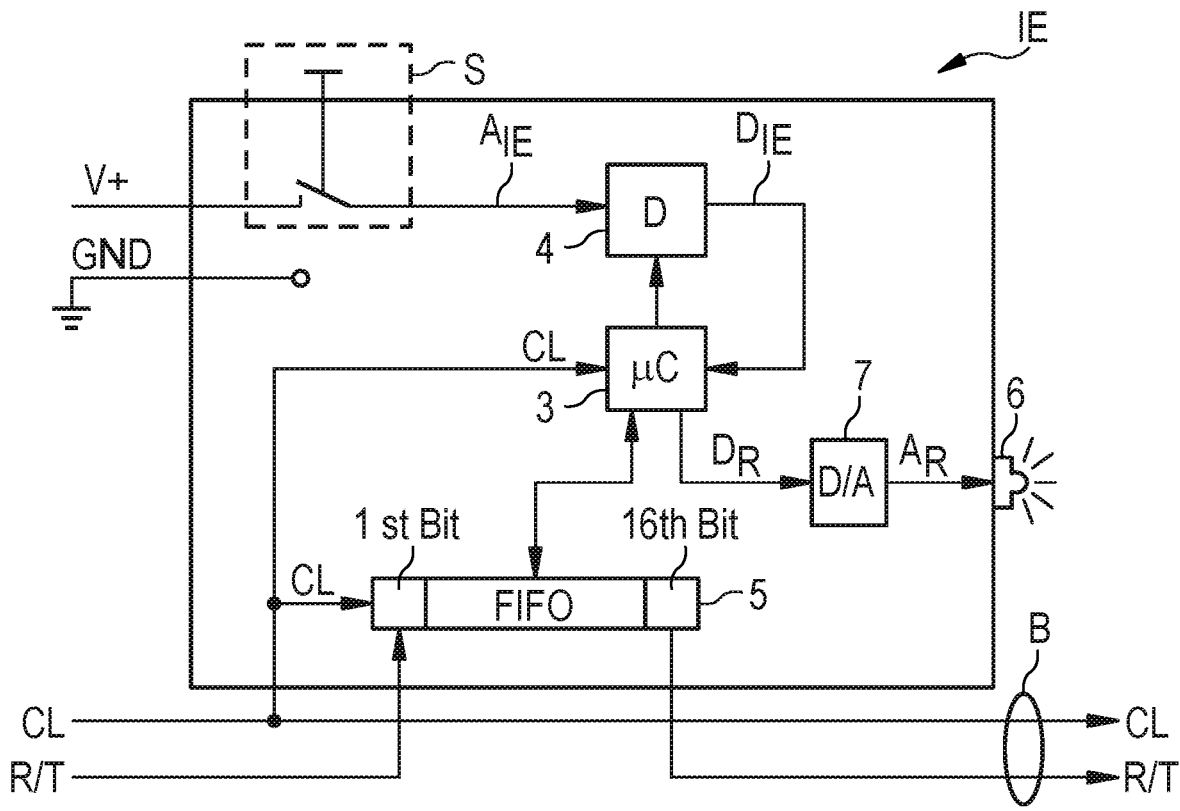
FIG. 3 illustrates a simplified block diagram of an input element in accordance with an embodiment of the present invention.

FIG. 3 illustrates a simplified block diagram of an input element IE in accordance with an embodiment of the present invention. According to FIG. 3 the input element IE may comprise an input device S which may be connected to the power supply V+ on one terminal and to an input converter 4 on its other terminal. Moreover, the input element IE may be connected to a ground terminal GND. It shall be understood that alternative input devices S, in particular, in the form of any analog switch, analog sensor and/or analog potentiometer may be used for the input element IE. According to one embodiment of the present invention the input device S may constitute an analog switch which may show the above-mentioned "contact bounce" or "chatter" which may result in a rapidly pulsed electric signal instead of a clean transition from 0 to 1 (i.e. full current). A data processing unit 3 may be realized by a microcontroller or microcomputer and controls the input converter 4, a shift register 5 and an optional output converter 7.

According to FIG. 3 the input device S may generate, when e.g. a user strokes the input device S, an analog input signal $A_{IE}$ which may be converted by the input converter 4 to a digital input signal $D_{IE}$. The input converter 4 may be realized by a conventional Analog-to-Digital Converter (ADC) comprising a plurality of microcontroller pins. According to the present invention and in order to simplify the circuitry within the input element IE, the input converter 4 may be also realized by a simple RC-circuit (not shown), wherein a parallel circuitry of a resistor and a capacitor is connected to ground and the charging time is measured (similar to a double ramp ADC). In this case the data processing unit 3 needs to have a bidirectional pin (in the microcontroller), which also should allow to set a high impedance state.

In case an Analog-to-Digital Converter (ADC) is used for the input converter 4 a corresponding digital input signal $D_{IE}$ is generated for the analog input signal $A_{IE}$ and submitted to the data processing unit 3 for evaluation, e.g. de-bouncing. The data processing unit 3 may submit the value of the corresponding digital input signal $D_{IE}$ into a shift register 5 of the input element IE which may be connected to a data receive/transmit line R/T. The shift register 5 may be a FIFO memory or any other register with a specific word length W and may be shifted on the basis of a clock information to the right or to the left. According to an embodiment of the present invention the word length W may be 16 Bits.

Furthermore, the input element IE may comprise an output converter 7 for converting a digital output signal $D_R$ to an analog output signal $A_R$. The analog output signal $A_R$ may be provided to an output device 6 for generating an output signal on the basis of the analog output signal $A_R$. The output device 6 may be an analog output device, and in particular an optical output device, e.g. a LED, an acoustical output device and/or a mechanical output device, e.g. vibration device. The digital output signal $D_R$ may be received from the input arrangement controller 2 (see FIG. 2) via the shift register 5 in the input element IE.

In addition to the clock information CL submitted by the input arrangement controller 2 the input element IE may comprise an input element clock (not shown). The input element clock may be at least several times higher than the clock information CL and may be provided to the data processing unit and/or converters 4 and 7 (not shown). In particular, the data processing unit 3 may determine a trigger signal for a READ/WRITE operation of the shift register 5 on the basis of a cycle length $CLL=W \times N_{IE}$, wherein W is the word length of the shift register 5 and $N_{IE}$ is the number of input elements IE within the input arrangement 1.

According to one embodiment of the present invention a serial interface B is used to realize a READ/WRITE operation. The serial interface B may comprise a power supply V+, a ground line GND, a clock line CL, a receive data line R, a transmit data line R and a select line S. Since a serial interface is used the layout of the input arrangement is less complex than in an input arrangement with matrix structure.

According to a further embodiment of the present invention the serial interface B for realizing a READ/WRITE operation may comprise a power supply V+, a ground line GND, a clock line CL, a receive/transmit data line R/T and a select line S. With a respective serial interface the complexity of the layout is further reduced.

According to a preferred embodiment of the present invention the serial interface B for realizing a READ/WRITE operation may merely comprise 4 lines, i.e. a power supply V+, a ground line GND, a clock line CL and a receive/transmit data line R/T. With a respective serial interface the complexity of the layout is further reduced while the complexity of an evaluation circuit is still low.

The READ/WRITE operation for this preferred embodiment shall be described in the following in more detail in connection with FIGS. 4 and 5.

Figure 4:
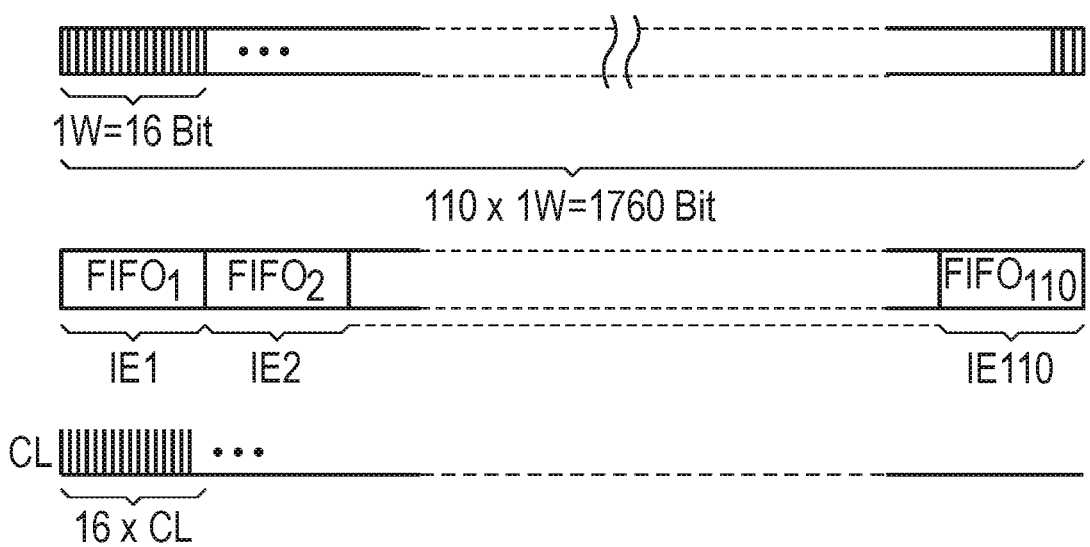
FIG. 4 illustrates a simplified diagram of the data structure used in accordance with an embodiment of the present invention.

FIG. 4 illustrates a simplified diagram of the data structure used in accordance with the preferred embodiment of the present invention. According to FIG. 2 the input arrangement may have $N_{IE}=n=110$ input elements IE. Of course a different number $N_{IE}$ of input elements IE is possible. Moreover, the word length of the shift register 5 shall be W=16 Bit. Of course a different value W may be used for the word length. As shown in FIG. 2 the $N_{IE}=110$ input elements IE1 to IE110 may be connected by a serial interface B in such a way that the $1^{st}$ Bit of the shift register 5 of the $1^{st}$ input element IE1 is connected via the data line R/T to the input arrangement controller. The last Bit, i.e. the $16^{th}$ Bit, of the shift register 5 of the $1^{st}$ input element IE1 may be connected via the data line R/T to the $1^{st}$ Bit of the shift register 5 of the $2^{nd}$ input element IE2 and so on until the last Bit, i.e. the $16^{th}$ Bit, of the shift register 5 of the $110^{th}$ input element IE110 may be again connected via the data line R/T to the input arrangement controller 2. Furthermore, a clock line CL may be provided to each input element IE1 to IE110, i.e. to each data processing unit 3 and each shift register 5 thereof.

This results in a ring shaped arrangement of 110 shift registers 5, e.g. FIFOs, and an overall data structure of 110×16 Bits=1760 Bits as shown in FIG. 4. This defines the cycle length $CLL=W \times N_{IE}$ of the input arrangement 1. Of course the word length W of the different input elements IE may also be different from each other, e.g. W1=16 Bits and W2=8 Bits, in this case a multiplication of the values W and $N_{IE}$ would not suitable, but the cycle length CLL would have to be defined by the total number of memory positions in the shift registers being serially connected. However, preferably all shift registers 5 of the input arrangement may have the same size or word length W.

When detecting the clock information CL each shift register 5 of the 110 input elements IE may shift its data by one Bit to the right. Thus, after detecting 1760 clock information, i.e. one complete cycle or cycle length, the data in the shift registers have been shifted for a complete cycle to the right. Of course all Bits may be also shifted to the left resulting in a same situation.

According to the present invention this information that one complete cycle was shifted may now be used to read data from the input elements IE and/or write data to the input elements IE. In detail, after a complete cycle, i.e. 1760 shift movements, the first 16 Bits which are written by the input arrangement controller 2 into the a.m. data structure will be in the shift register 5 of the 110th input element IE110, the second 16 Bits which are written by the input arrangement controller 2 into the a.m. data structure will be in the shift register 5 of the 109th input element and so on, while the last 16 Bits which are written by the input arrangement controller 2 into the a.m. data structure will be in the shift register 5 of the 1st input element IE1.

Thus, each data processing unit 3 of each input element IE may take advantage of this situation to define a READ and/or WRITE operation to its shift register 5 without using an additional select line. In detail, by counting the number of clock information, i.e. clocks CL, each input element creates its own trigger for accessing its shift register and in order to read and/or write data therefrom/therein. Thus, each input element may have a counter which is 0 after power on. A cycle length CLL may be stored in each input element IE or may be calculated on the basis of the word length W of the shift register 5 and the total number $N_{IE}$ of input elements IE. The word length W and the total number $N_{IE}$ of input elements IE may be stored beforehand or transmitted during an initialization procedure to the input element IE.

When detecting the clock information CL the clock counter of each input element IE may be increased by 1 and the data in the shift register may be shifted by 1 Bit. The clock information may be a rising edge or a falling edge of a clock signal CL. The clock information may also be derived from a so called 1-wire-interface. In this case the complexity of the layout is further reduced. Moreover, the synchronization between the input arrangement controller and each input element may be realized in an asynchronous or synchronous manner by the serial interface.

Figure 5:
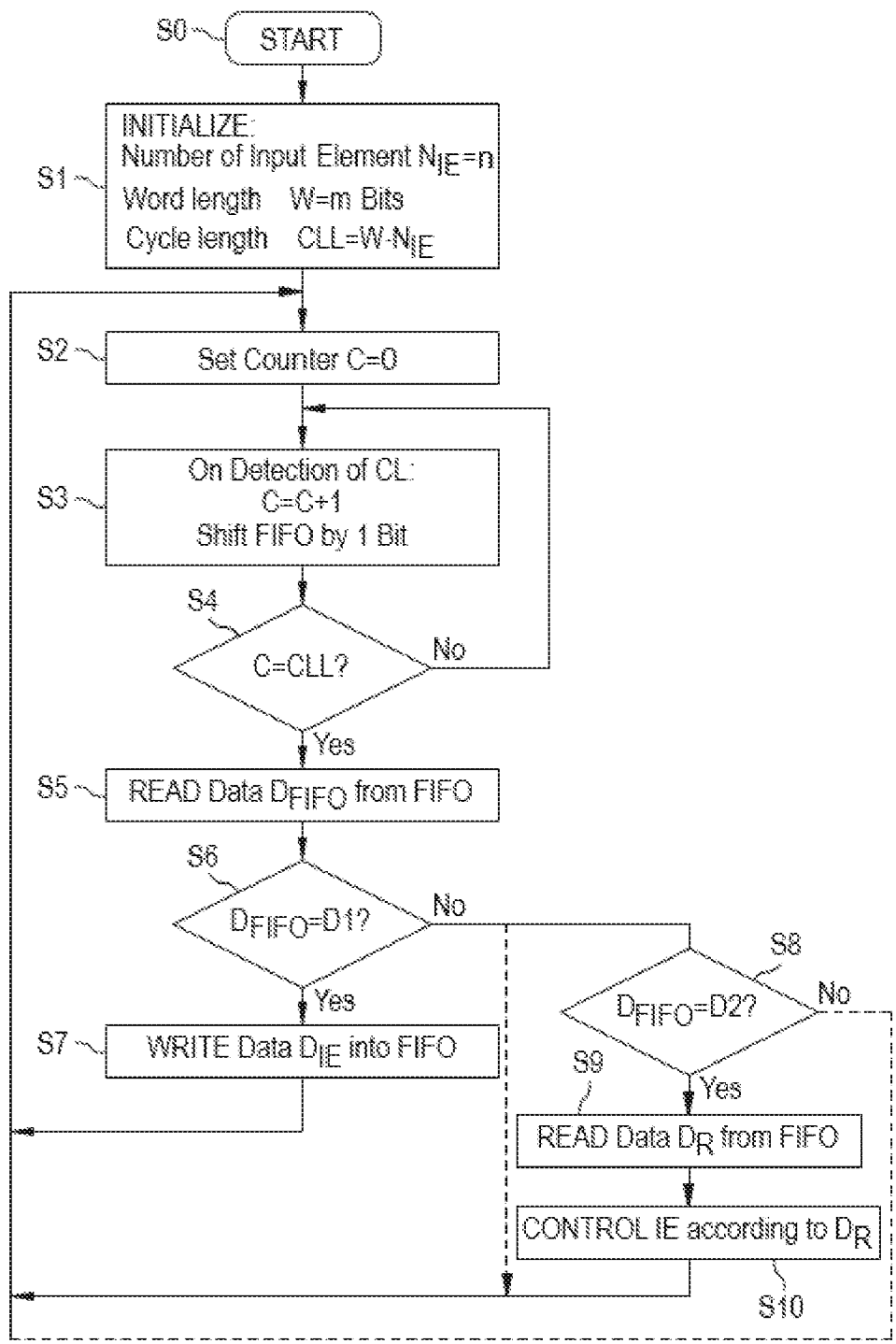
FIG. 5 illustrates a simplified flow chart of the processing routine used in the input element in accordance with an embodiment of the present invention.

FIG. 5 illustrates a simplified flow chart of the processing routine used in the input element in accordance with an embodiment of the present invention.

After a start in step S0 there may be an initialization step S1 for setting the number $N_{IE}$ of input elements to a value n of input elements IE being serially connected within the actual input arrangement 1. Furthermore, the word length W may be set to a value of m Bits defining the Bit-length of the shift register 5. On the basis of these values the cycle length $CLL = W \times N_{IE}$ for one complete cycle may be calculated. Alternative the cycle length CLL may be stored in advance to each input element IE. Alternatively, the word length W, total number $N_{IE}$ of input elements and/or the cycle length CLL may be transmitted during initialization step S1 to each input element. Furthermore, the data in each shift register 5 may be set to 0. The optional initialization step S1 may be executed during a power-on procedure, when the input element receives power supply.

In step S2 the clock counter C is set to a start value 0, which defines the beginning of a cycle.

In step S3 the clock counter C is increased by 1 and the data within the shift register 5 are shifted by one bit to the right or left, when detecting a clock information CL.

In step S4 the value C of the clock counter is compared with the cycle length CLL, e.g. $CLL = W \times N_{IE}$, wherein W is the word length of the shift register 5 and $N_{IE}$ is the number of input elements within the input arrangement 1 and connected in series by the data line R/T. In the present embodiment the cycle length CLL may be 1760 Bit. In case the counter C shows 1760 the flowchart proceeds to step S5 for reading the data in the shift register 5. In case the counter C is unequal to 1760 the flowchart returns to step S3 to further increase the counter.

In step S5 the data $D_{FIFO}$ which were delivered from the input arrangement controller 2 by the multiple shifting procedure may be read from the shift register 5 for evaluation.

In detail, in a step S6 said read data $D_{FIFO}$ from the shift register 5 may be compared with a predetermined first data value D1, e.g. "0000 0000 0000 0001", which may represent DATA READING from the input element IE.

Thus, in case the comparison result in this step S6 is positive the flowchart proceeds to step S7, wherein digital input signal data $D_{IE}$ being derived from the analog input device S within the last cycle may be written into the shift register 5. Thus, data D1 may be replaced in the shift register 5 by a digital value representing a status information (e.g. key pressed or released) of the input element IE.

As a matter of course, since the shifting operation is an ongoing operation, depending on the position of the input element within the data ring structure the digital value representing its status information is transmitted to the input arrangement controller 2 which assigns this value to the respective input element by its own clock counter. In contrast to the input elements IE which generate a trigger signal only every complete cycle, e.g. 1760 clocks, the input arrangement controller may generate a respective trigger signal depending on the word length of each register, e.g. every 16 clocks. Since it knows what it has send in the previous cycle, e.g. data D1 for DATA READING, it will now read the corresponding 16 Bits as status information of the corresponding $n^{th}$ input element IEn. These data may be further evaluated by the input arrangement controller and/or sent to the personal computer.

However, in case the comparison result in this step S6 is negative the flowchart may proceed to step S2 (only DATA READING is possible) or to a step S8 (also DATA WRITING is possible).

In case the flowchart proceeds to the step S8 said read data $D_{FIFO}$ from the shift register 5 may be compared with a predetermined second data value D2, e.g. "0000 0000 0000 0010", which may represent DATA WRITING to the input element IE.

Thus, in case the comparison result in this step S8 is positive the flowchart proceeds to step S9, wherein a subroutine is started which e.g. reads the data for the next v cycles, wherein v=1 to 5. The input arrangement controller which sent this DATA WRITING command will now "send" for the next v following cycles data $D_R$ to the respective input element which will be recognized by the input element as such data. The flowchart then proceeds to step S10.

In step S10 a respective further cycle counter may be activated to count the number of the following v read cycles and data $D_R$ are read out from the FIFO in a similar way and the input element IE may be controlled according to said read data. In particular, the number of read cycles in step S9 may be v=3 to receive 3 read data $D_{R1}$, $D_{R2}$, $D_{R3}$, and in step S10 an output device 6, particularly a RGB-LED, of the input element IE is controlled according to these read data $D_{R1}$, $D_{R2}$, $D_{R3}$. Alternatively, the number of read cycles may be v=1 to receive exactly 1 read data $D_R$, and in step S10 a threshold, a sensitivity or a calibration value of the input element IE may be controlled according to this read data $D_R$. Thus, an aging and deterioration of input elements and, particularly, its input devices S may be compensated. Of course on the other side, i.e. in the input arrangement controller 2, the meaning of the sent data D2 is also known and, thus, after sending this data a corresponding number v of send cycles with data $D_R$ would follow.

However, in case the comparison result in this step S8 is negative the flowchart may proceed back to step S2 or to a further step (not shown), wherein further control of the input element IE similar to steps S6 and S8 may be executed.

FIG. 5 illustrates also a flowchart of a computer program product according to the present invention. It will be understood that each block or step of the flowchart and combinations of blocks in the flowchart, can be implemented by computer program instructions. These computer program instructions may be loaded onto a data processing unit or another programmable apparatus to produce a machine, such that the instructions which are executed on the data processing unit or other programmable apparatus create means for implementing the function specified in the blocks or steps of the flowchart. These computer program instructions may also be stored in a computer-readable memory, e.g. DVD, CD, diskette, that can direct a data processing unit or other programmable apparatus to function in a particular manner. Moreover, these computer program instructions may be downloaded in e.g. a telecommunications network to cause operational steps to be performed on the data processing unit or other programmable apparatus to produce a computer implemented process such that the instructions which execute on the data processing unit or other programmable apparatus provide steps for implementing the functions specified in the blocks or steps of the flowchart.

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart can be implemented by special purpose hardware-based computer systems which perform the specified function or steps or combinations of the special purpose hardware and computer instructions.

Although embodiments of the present invention and their advantages have been described in detail, it should be understood that various changes, substitutions and alterations can be made therein without departing from the spirit and scope of the invention as defined by the appended claims. For example, it will be readily understood by those skilled in the art that many of the features, functions, processes and methods described herein may be varied while remaining within the scope of the present invention. Moreover, the scope of the present application is not intended to be limited to the particular embodiments of the system, process, manufacture, method or steps described in the present invention. As one of ordinary skill in the art will readily appreciate from the disclosure of the present invention systems, processes, manufacture, methods or steps presently existing or to be developed later, that perform substantially the same function or achieve substantially the same result as the corresponding embodiments described herein may be utilized according to the present invention. Accordingly, the appended claims are intended to include within their scope such systems, processes, methods or steps.

REFERENCE LIST 1 input arrangement
2 input arrangement controller
3 data processing unit
4 input converter
5 shift register
6 output device
7 output converter
S input device
IE, IE1, . . . input element
$A_{IE}$ analog input signal
$D_{IE}$ digital input signal
$D_R$ digital output signal
$A_R$ analog output signal
B serial interface
V+ power supply
GND ground
CL clock line
R/T data line
S0-S10 method steps

The invention claimed is:

1. A method for operating an active input element of an input arrangement, wherein the active input element comprises a clock counter, a shift register, and a data processing unit, and wherein the method is carried out by the data processing unit and comprises the steps:
    a) set value of clock counter to 0;
    b) increase value of clock counter by 1 and shift data in the shift register by one bit, when detecting a clock information;
    c) compare value of the clock counter with a cycle length CLL, and return to step b) if comparison result is negative or proceed to step d) if comparison result is positive;
    d) read data from the shift register;
    e) compare said read data from shift register with predetermined first data value, and
    proceed to step f) if comparison result is positive or proceed to step a) if comparison result is negative;
    f) write data derived from analog input device into shift register and return to step a).

2. The method according to claim 1, comprising an initialization step for setting a number $N_{IE}$ of input elements to a value n of input elements being serially connected within the input arrangement, for setting a word length W to a value of m bits defining the length of the shift register, and for calculating said cycle length $CLL=W \times N_{IE}$.

3. The method according to claim 1, wherein said clock information is provided by an input arrangement controller.

4. A non-transitory computer program product having computer readable program code portions which when executed on a controller cause the controller to carry out the method steps according to claim 1.

5. A method for operating an active input element of an input arrangement wherein the active input element comprises a clock counter, a shift register, and a data processing unit, and wherein the method is carried out by the data processing unit and comprises the steps:
    a) set value of clock counter to 0;
    b) increase value of clock counter by 1 and shift data in the shift register by one bit, when detecting a clock information;
    c) compare value of the clock counter with a cycle length CLL, and return to step b) if comparison result is negative or proceed to step d) if comparison result is positive;
    d) read data from the shift register;
    e) compare said read data from the shift register with predetermined first data value, and
    proceed to step if comparison result is positive or proceed to step a) or g) if comparison result is negative;
    f) write data derived from analog input device into shift register and return to step a),
    g) compare said read data from shift register with predetermined second data value, and
    proceed to step h) if comparison result is positive or proceed to step a) if comparison result is negative;
    h) read data from shift register for next following v read cycles, wherein v=1 to 5;
    i) evaluate said read data and control input element according to said read data.

6. The method according to claim 5, wherein in step h) the number of read cycles is v=3 to receive 3 read data, and in step i) an output device, particularly a RGB-LED, of the input element is controlled according to these read data.

7. The method according to claim 5, wherein in step h) the number of read cycles is v=1 to receive 1 read data, and in step i) threshold, sensitivity or calibration values of the input element are controlled according to this read data.

8. A non-transitory computer program product having computer readable program code portions which when executed on a controller cause the controller to carry out the method steps according to claim 5.

9. The method according to claim 5, comprising an initialization step for setting a number $N_{IE}$ of input elements to a value n of input elements being serially connected within the input arrangement, for setting a word length W to a value of m bits defining the length of the shift register, and for calculating said cycle length $CLL = W \times N_{IE}$.

10. The method according to claim 5, wherein said clock information is provided by an input arrangement controller.

* * * * *